(12) United States Patent
Zerkel

(10) Patent No.: US 6,341,795 B1
(45) Date of Patent: Jan. 29, 2002

(54) TRAILER HITCH COUPLING DEVICE

(76) Inventor: Robert D. Zerkel, P.O. Box 129, Scotts Mills, OR (US) 97375

(*) Notice: Subject to any disclaimer, the term of this patent is extended or adjusted under 35 U.S.C. 154(b) by 0 days.

(21) Appl. No.: 09/653,846

(22) Filed: Sep. 1, 2000

(51) Int. Cl.[7] ................................................. B60D 1/46
(52) U.S. Cl. ........................ 280/490.1; 280/491.2; 280/511
(58) Field of Search .................... 280/490.1, 491.1, 280/491.2, 491.5, 511, 504

(56) References Cited

U.S. PATENT DOCUMENTS

| | | | |
|---|---|---|---|
| 2,847,232 A | 8/1958 | Graham | |
| 3,035,856 A | * 5/1962 | Mlecko | ................... 280/490.1 |
| 3,655,221 A | 4/1972 | Warner | |
| 3,856,354 A | * 12/1974 | Davis | ...................... 280/490.1 |
| 4,000,911 A | * 1/1977 | Weber | ..................... 280/490.1 |
| 4,111,449 A | * 9/1978 | Hancock | ...................... 280/402 |
| 4,148,498 A | 4/1979 | Taylor, Jr. | |
| 4,662,647 A | 5/1987 | Calvert | |
| 5,354,087 A | * 10/1994 | Head | ....................... 280/490.1 |
| 5,413,366 A | 5/1995 | Gibbons | |
| D397,067 S | 8/1998 | Mccoy et al. | |

* cited by examiner

*Primary Examiner*—Anne Marie Boehler

(57) ABSTRACT

A trailer hitch coupling device for altering the angle of the tongue of the trailer hitch with respect to the vehicle. The trailer hitch coupling device includes a rod. The rod is elongate and has a first end and a second end. The rod has a front side, a back side and a pair of lateral sides. The rod is generally hollow and has a plurality of pairs of opposed holes therein. The holes extend through the lateral sides. The front side of the rod has an elongate slot therein. A bar is integrally coupled to and extends away from the back side of the rod. The rod has a free end having a bore extending therein such that the bar is substantially hollow. The bar has a peripheral side wall having a plurality of pairs of opposed apertures therein. The bore is adapted for receiving the tongue portion of a trailer hitch. A ball engaging member for engaging a ball hitch is movably positioned in the rod and extending outwardly through the slot. A plurality of securing members removably secures the tongue in the bar and selectively secures the ball engaging member between the first and second ends of the rod.

5 Claims, 3 Drawing Sheets

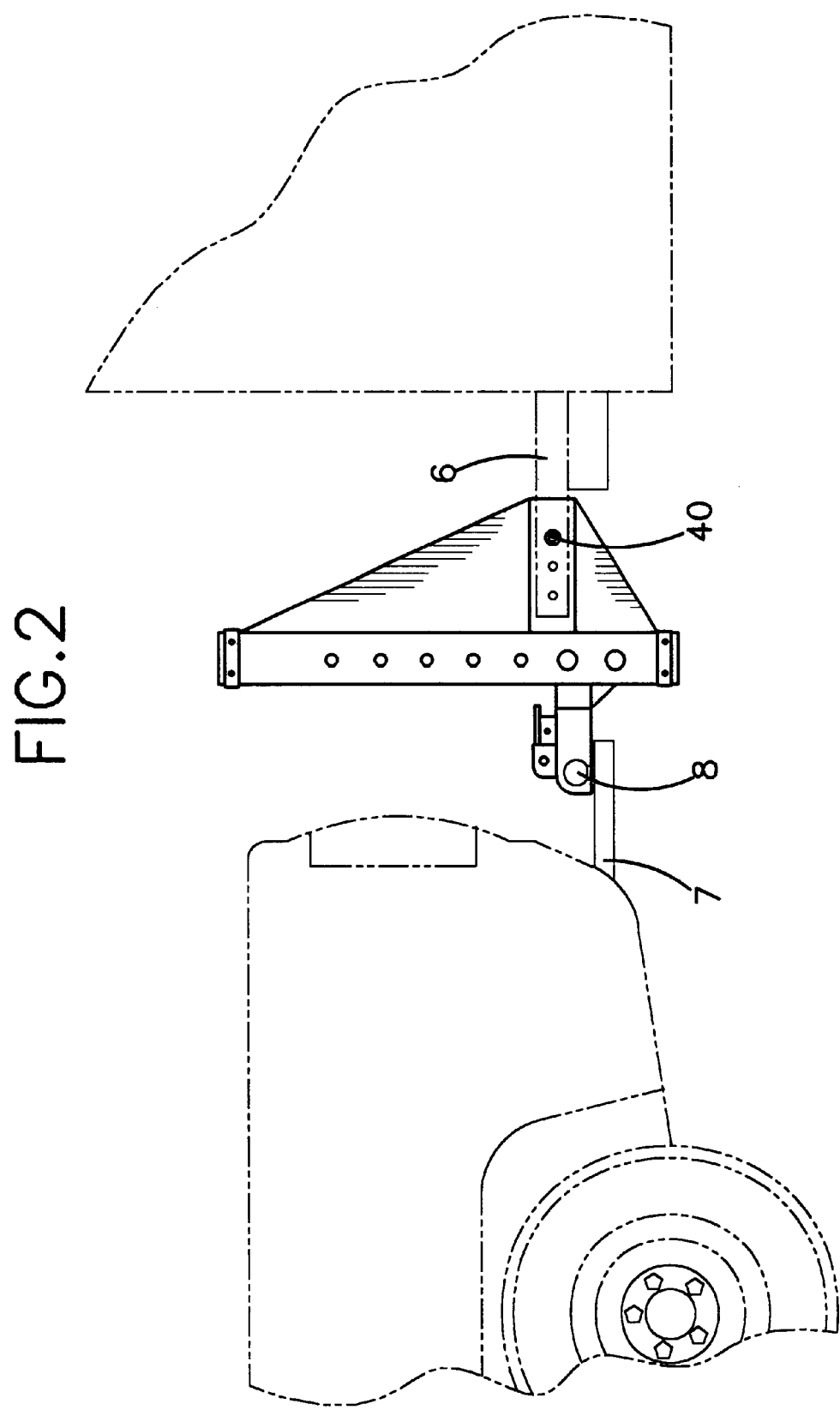

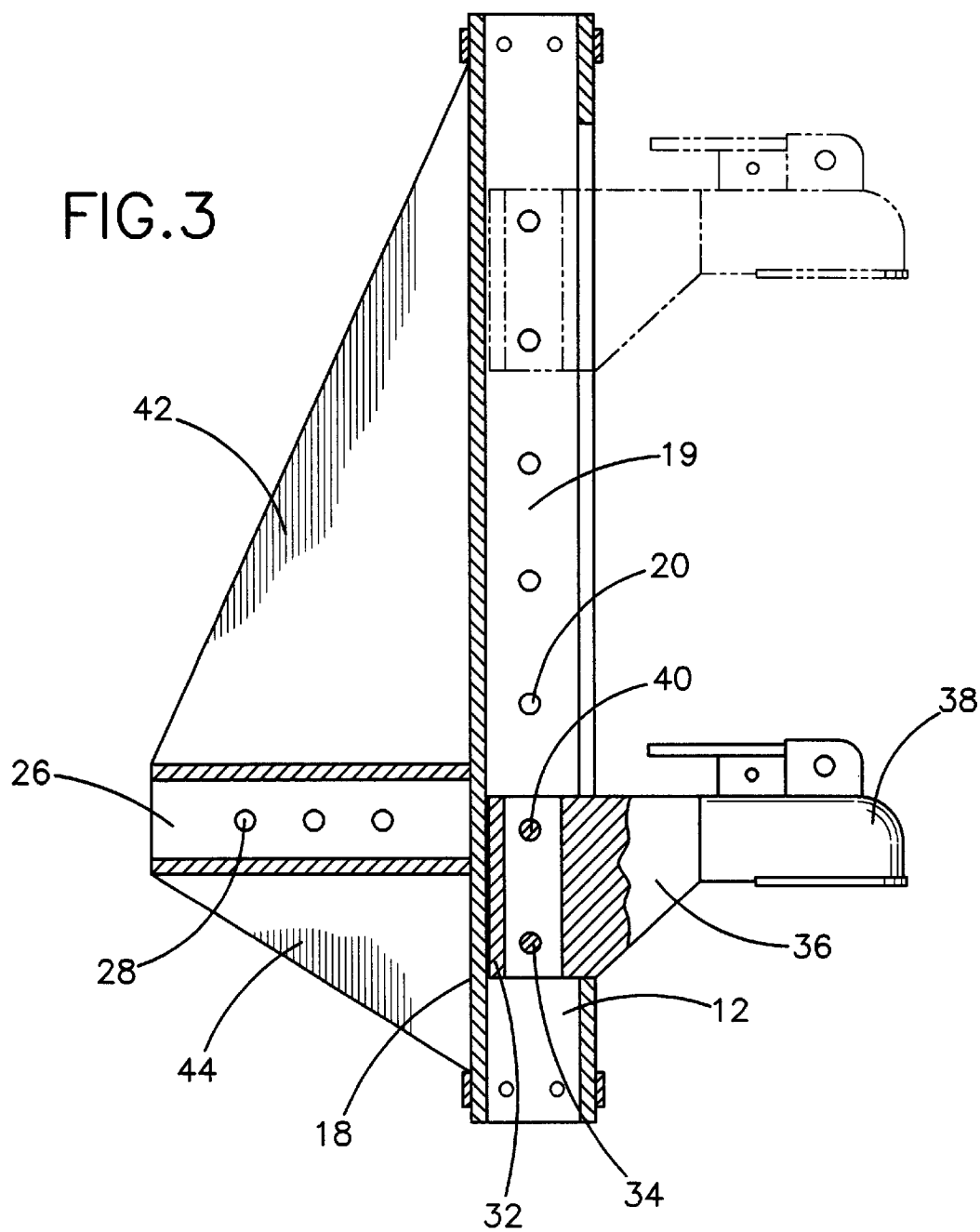

TRAILER HITCH COUPLING DEVICE

BACKGROUND OF THE INVENTION

1. Field of the Invention

The present invention relates to trailer hitches and more particularly pertains to a new trailer hitch coupling device for altering the angle of the tongue of the trailer hitch with respect to the vehicle.

2. Description of the Prior Art

The use of trailer hitches is known in the prior art. More specifically, trailer hitches heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,847,232; 3,655,221; 4,662,647; 5,413,366; 4,148,498; and U.S. Pat. No. Des. 397,067.

While these devices fulfill their respective, particular objectives and requirements, the aforementioned patents do not disclose a new trailer hitch coupling device. The inventive device includes a rod. The rod is elongate and has a first end and a second end. The rod has a front side, a back side and a pair of lateral sides. The rod is generally hollow and has a plurality of pairs of opposed holes therein. The holes extend through the lateral sides. The front side of the rod has an elongate slot therein. A bar is integrally coupled to and extends away from the back side of the rod. The rod has a free end having a bore extending therein such that the bar is substantially hollow. The bar has a peripheral side wall having a plurality of pairs of opposed apertures therein. The bore is adapted for receiving the tongue portion of a trailer hitch. A ball engaging member for engaging a ball hitch is movably positioned in the rod and extending outwardly through the slot. A plurality of securing members removably secures the tongue in the bar and selectively secures the ball engaging member between the first and second ends of the rod.

In these respects, the trailer hitch coupling device according to the present invention substantially departs from the conventional concepts and designs of the prior art, and in so doing provides an apparatus primarily developed for the purpose of altering the angle of the tongue of the trailer hitch with respect to the vehicle.

SUMMARY OF THE INVENTION

In view of the foregoing disadvantages inherent in the known types of trailer hitches now present in the prior art, the present invention provides a new trailer hitch coupling device construction wherein the same can be utilized for altering the angle of the tongue of the trailer hitch with respect to the vehicle.

The general purpose of the present invention, which will be described subsequently in greater detail, is to provide a new trailer hitch coupling device apparatus and method which has many of the advantages of the trailer hitches mentioned heretofore and many novel features that result in a new trailer hitch coupling device which is not anticipated, rendered obvious, suggested, or even implied by any of the prior art trailer hitches, either alone or in any combination thereof.

To attain this, the present invention generally comprises a rod. The rod is elongate and has a first end and a second end. The rod has a front side, a back side and a pair of lateral sides. The rod is generally hollow and has a plurality of pairs of opposed holes therein. The holes extend through the lateral sides. The front side of the rod has an elongate slot therein. A bar is integrally coupled to and extends away from the back side of the rod. The rod has a free end having a bore extending therein such that the bar is substantially hollow. The bar has a peripheral side wall having a plurality of pairs of opposed apertures therein. The bore is adapted for receiving the tongue portion of a trailer hitch. A ball engaging member for engaging a ball hitch is movably positioned in the rod and extending outwardly through the slot. A plurality of securing members removably secures the tongue in the bar and selectively secures the ball engaging member between the first and second ends of the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch coupling device apparatus and method which has many of the advantages of the trailer hitches mentioned heretofore and many novel features that result in a new trailer hitch coupling device which is not anticipated, rendered obvious, suggested, or even implied by any of the prior art trailer hitches, either alone or in any combination thereof.

It is another object of the present invention to provide a new trailer hitch coupling device which may be easily and efficiently manufactured and marketed.

It is a further object of the present invention to provide a new trailer hitch coupling device which is of a durable and reliable construction.

An even further object of the present invention is to provide a new trailer hitch coupling device which is susceptible of a low cost of manufacture with regard to both materials and labor, and which accordingly is then susceptible of low prices of sale to the consuming public, thereby making such trailer hitch coupling device economically available to the buying public.

Still yet another object of the present invention is to provide a new trailer hitch coupling device which provides in the apparatuses and methods of the prior art some of the advantages thereof, while simultaneously overcoming some of the disadvantages normally associated therewith.

Still another object of the present invention is to provide a new trailer hitch coupling device for altering the angle of the tongue of the trailer hitch with respect to the vehicle.

Yet another object of the present invention is to provide a new trailer hitch coupling device which includes a rod. The rod is elongate and has a first end and a second end. The rod has a front side, a back side and a pair of lateral sides. The rod is generally hollow and has a plurality of pairs of opposed holes therein. The holes extend through the lateral sides. The front side of the rod has an elongate slot therein. A bar is integrally coupled to and extends away from the back side of the rod. The rod has a free end having a bore extending therein such that the bar is substantially hollow. The bar has a peripheral side wall having a plurality of pairs of opposed apertures therein. The bore is adapted for receiving the tongue portion of a trailer hitch. A ball engaging member for engaging a ball hitch is movably positioned in the rod and extending outwardly through the slot. A plurality of securing members removably secures the tongue in the bar and selectively secures the ball engaging member between the first and second ends of the rod.

Still yet another object of the present invention is to provide a new trailer hitch coupling device that may be used with existing ball hitches.

Even still another object of the present invention is to provide a new trailer hitch coupling device that reduces stress on the ball hinge and the tongue of the trailer by allowing both to remain relatively horizontal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic side view of the present invention.

FIG. 3 is a schematic side view of the present invention.

DESCRIPTION OF THE PREFERRED EMBODIMENT

Figure 1:
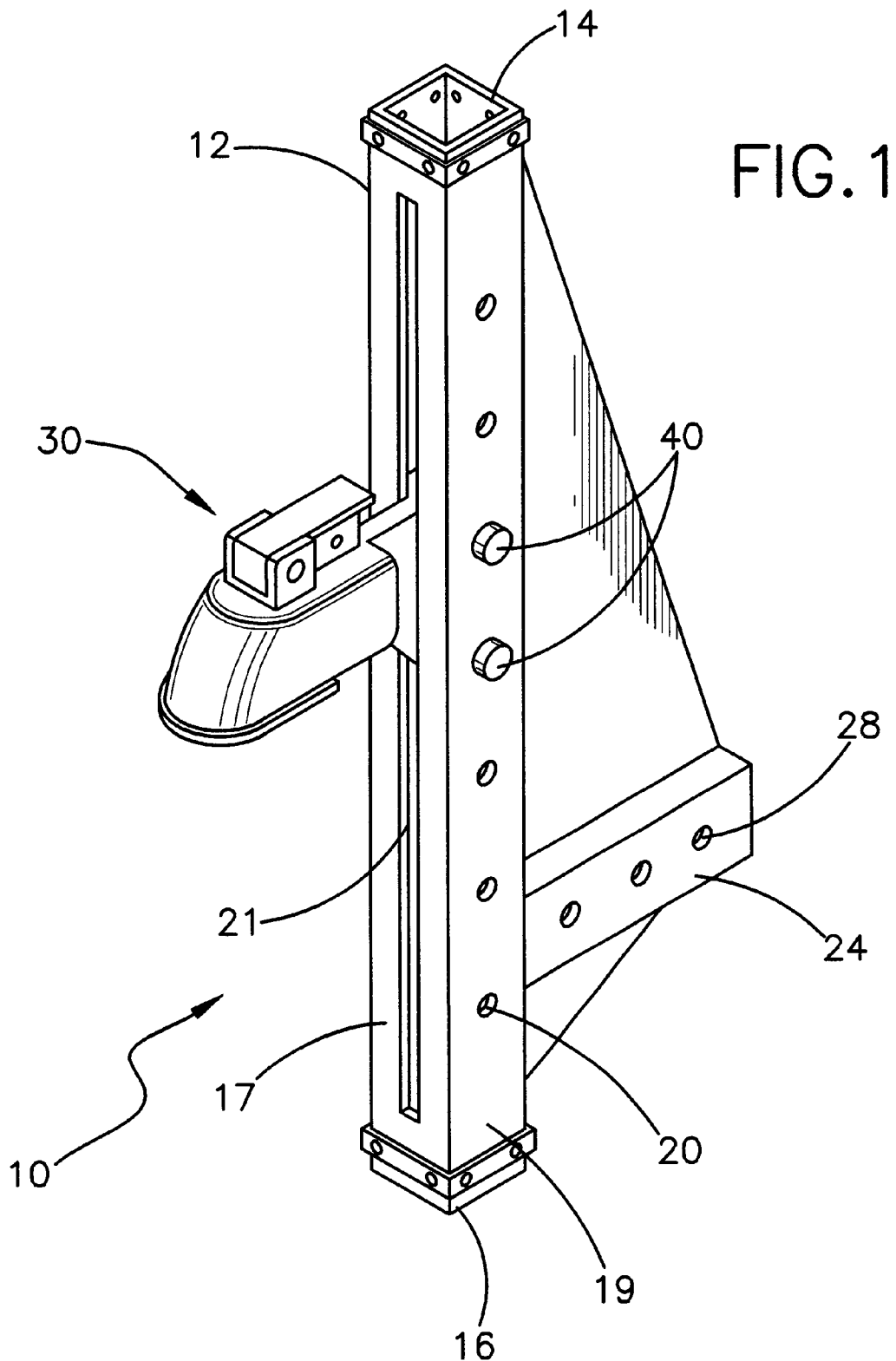
FIG. 1 is a schematic perspective view of a new trailer hitch coupling device according to the present invention.

With reference now to the drawings, and in particular to FIGS. 1 through 3 thereof, a new trailer hitch coupling device embodying the principles and concepts of the present invention and generally designated by the reference numeral 10 will be described.

As best illustrated in FIGS. 1 through 3, the trailer hitch coupling device 10 generally comprises a device for coupling a trailer tongue 6 to the ball portion 8 of a ball hitch 7 of a vehicle. The device includes a rod 12. The rod 12 is elongate and has a first end 14 and a second end 16. The rod 12 has a front side 17, a back side 18 and a pair of lateral sides 19. The rod 12 is generally hollow and has a plurality of pairs of opposed holes 20 therein. The holes 20 extend through the lateral sides 19. The front side 17 of the rod has an elongate slot 21 therein. The slot 21 extends from a point generally adjacent to the first end 14 to a point generally adjacent to the second end 16.

A bar 24 is integrally coupled to and extends away from the back side 18 of the rod 12. The bar 24 has a free end having a bore 26 extending therein such that the bar is substantially hollow. The bar 24 has a peripheral side wall has a plurality of pairs of opposed apertures 28 therein. The bore 26 has a size and shape adapted for receiving the tongue portion 6. The bar 24 is orientated generally perpendicular to a longitudinal axis of the rod 12. The bar 24 is positioned nearer the second end 16 than the first end 14 of the rod 12.

A ball engaging member 30 includes a base portion 32 that is movably positioned in the rod 12 such that the base portion 32 may be selectively positioned between the first 14 and second 16 ends of the rod 12. The base portion 32 has a pair of openings 34 extending therethrough. Each of the openings 34 corresponds to one of the pair of opposed holes 20. An arm portion 36 is integrally coupled to and extends away from the base portion 32. The arm portion 32 extends through the slot 21. A ball receiving member 38 is integrally coupled to a free end of the arm 36. The ball receiving member 38 is adapted to removably couple to the ball portion 8. The ball receiving member 38 is a conventional ball receiving member used for coupling to ball hitches.

A plurality of securing members 40 removably secures the tongue 6 in the bar 24 and selectively secures the ball engaging member 30 between the first 14 and second 16 ends of the rod 12. Each of the securing members 40 comprises a pin. One of the pins is extended through the opposed apertures 28 in the bar 24 and through an opening extending through the tongue 6. Each of two of the pins is extended through one of the pairs of opposed holes 20 and through one of the openings 34 in the base member 32.

Each of a pair of bracing members 42, 44 comprises a wall. Each of the walls 42, 44 is integrally coupled to and extends between the back side 18 of the rod 12 and the bar 24. A first 42 of the walls is positioned between the bar 24 and the first end 14 of the rod 12. A second 44 of the walls is positioned between the bar 24 and the second end 16 of the rod 12. Each of the walls has a generally rectangular shape.

In use, the device 10 is used to coupled the tongue portion 6 of a trailer hitch to the ball hitch on the vehicle. The ball engaging member 30 may be slid up and down with respect to the rod 12 so that the trailer remains in a generally horizontal position with respect to the ground. This causes less stress on the ball hitch 7 and on the tongue 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hitch coupling device for coupling a trailer to a vehicle, the trailer having a tongue portion extending therefrom, the vehicle having an elongate member extending rearwardly from the vehicle and having a ball portion thereon, said device comprising:

a rod being elongate and having an upper first end and a lower second end, said rod having a front side, a back side and a pair of lateral sides, said rod being generally hollow, said rod having a plurality of pairs of opposed holes therein, said holes extending through said lateral sides, said front side of said rod having an elongate slot therein;

a bar, said bar being fixedly coupled to and extending substantially perpendicularly away from said back side of said rod, said bar having a free end having a bore extending therein for receiving the tongue portion of the trailer, said bar having a peripheral side wall having a plurality of pairs of opposed apertures therein for receiving a fastener passing through the tongue portion and said bar;

a ball engaging member, said ball engaging member being movably positioned in said rod and extending through said slot;

a plurality of securing members for removably securing said tongue in said bar and for selectively securing said ball engaging member between said first and second ends of said rod;

a pair of bracing members, each of said bracing members comprising a wall, each of said walls being integrally coupled to and extending between said back side of said rod and said bar, a first of said walls extending upwardly from an upper surface of said bar toward said upper first end of said rod, a second of said walls being extending downwardly from a lower surface of said bar toward said lower second end of said rod for securing said bar in the substantially perpendicular relationship to said rod.

2. The trailer hitch coupling device as in claim 1, wherein said ball engaging member comprises:

a base portion, said base portion being movably positioned in said rod such that said base portion may selectively be positioned between said first and second ends of said rod, said base portion having at least one opening extending therethrough;

an arm portion, said arm portion being integrally coupled to and extending away from said base portion, said arm portion extending through said slot; and a ball receiving member, said ball receiving member being integrally coupled to a free end of said arm.

3. The trailer hitch coupling device as in claim 1, wherein each of said securing members comprises:

a pin, wherein one of said pins is extended through said opposed apertures in said bar for extending through an opening in said tongue portion, and another of said pins is extended through one of said pairs of opposed holes and through said opening in said base member.

4. The trailer hitch coupling device as in claim 1, wherein a distance between the upper first end of said rod and said bar is approximately three times a distance between the lower second end of said rod and said bar.

5. A trailer hitch coupling device for coupling a trailer to a vehicle, the trailer having a tongue portion extending therefrom, the vehicle having an elongate member extending rearwardly from the vehicle and having a ball portion thereon, said device comprising:

a rod, said rod being elongate and having a first end and a second end, said rod having a front side, a back side and a pair of lateral sides, said rod being generally hollow, said rod having a plurality of pairs of opposed holes therein, said holes extending through said lateral sides, said front side of said rod having an elongate slot therein, said slot extending from a point generally adjacent to said first end to a point generally adjacent to said second end;

a bar, said bar being integrally coupled to and extending away from said back side of said rod, said bar having a free end having a bore extending therein such that said bar is substantially hollow, said bar having a peripheral side wall having a plurality of pairs of opposed apertures therein, said bore having a size and shape adapted for receiving said tongue portion, said bar being orientated generally perpendicular to a longitudinal axis of said rod, said bar being positioned nearer said second end;

a ball engaging member, said ball engaging member comprising;

a base portion, said base portion being movably positioned in said rod such that said base portion may selectively be positioned between said first and second ends of said rod, said base portion having a pair of openings extending therethrough, each of said openings corresponding to one of said pair of opposed holes;

an arm portion, said arm portion being integrally coupled to and extending away from said base portion, said arm portion extending through said slot;

a ball receiving member, said ball receiving member being integrally coupled to a free end of said arm, said ball receiving member being adapted to removably couple to said ball portion;

a plurality of securing members for removably securing said tongue in said bar and for selectively securing said ball engaging member between said first and second ends of said rod, each of said securing members comprising a pin, wherein one of said pins is extended through said opposed apertures in said bar and through an opening extending through said tongue, and wherein each of two of said pins are extended through one of said pairs of opposed holes and through one of said openings in said base member; and a pair of bracing members, each of said bracing members comprising a wall, each of said walls being integrally coupled to and extending between said back side of said rod and said bar, a first of said walls extending upwardly from an upper surface of said bar toward said upper first end of said rod, a second of said walls being extending downwardly from a lower surface of said bar toward said lower second end of said rod for securing said bar in the substantially perpendicular relationship to said rod;

wherein a distance between the upper first end of said rod and said bar is approximately three times a distance between the lower second end of said rod and said bar.

* * * * *